United States Patent [19]
Pierce

[11] 3,929,439
[45] Dec. 30, 1975

[54] METHOD FOR PREPARING A HIGHLY SILICEOUS ALKALI METAL SILICATE GLASS AND HYDRATED POWDER

[75] Inventor: Richard H. Pierce, Broomall, Pa.

[73] Assignee: Philadelphia Quartz Company, Valley Forge, Pa.

[22] Filed: July 8, 1974

[21] Appl. No.: 486,558

[52] U.S. Cl. .................. 65/22; 65/27; 65/134; 65/DIG. 14; 106/52; 106/74; 106/75; 423/332; 423/334
[51] Int. Cl.² C03B 19/08; C03B 5/16; C03B 31/00
[58] Field of Search ......... 65/27, 134, DIG. 14, 27, 65/22; 106/DIG. 8, 74, 75, 52; 252/313 S; 423/332, 334

[56] References Cited
UNITED STATES PATENTS

| | | | |
|---|---|---|---|
| 3,001,881 | 9/1961 | Slayter | 106/DIG. 8 |
| 3,065,089 | 11/1962 | Hustinx | 106/DIG. 8 |
| 3,503,790 | 3/1970 | Griiygras | 117/118 X |
| 3,542,534 | 11/1970 | Yamamoto | 65/27 |
| 3,682,666 | 8/1972 | LaCourrege | 65/134 X |
| 3,690,822 | 9/1972 | Myers | 423/334 |
| 3,712,941 | 1/1973 | Myers | 423/322 |
| 3,726,697 | 4/1973 | Mod et al. | 65/27 |
| 3,745,126 | 7/1974 | Moore, Jr. | 252/313 S |
| 3,870,496 | 3/1975 | Cutler | 65/22 |

FOREIGN PATENTS OR APPLICATIONS

| | | | |
|---|---|---|---|
| 1,034 | 1852 | United Kingdom | 106/DIG. 8 |

OTHER PUBLICATIONS

Journal of Amer–Ceramic Society—Dec. 1971 pp. 639–640.

Primary Examiner—S. Leon Bashore
Assistant Examiner—Frank W. Miga
Attorney, Agent, or Firm—Fred C. Philpitt; Ernest G. Posner

[57] ABSTRACT

This invention relates to the preparation of alkali metal silicate glasses of high silica to alkali ratio by a method comprising the following steps: forming a colloidal solution by combining an alkali metal silicate solution and a silica sol, drying the colloidal solution to obtain an alkali metal silicate powder and fusing said powder to form a uniform molten glass. This method also can be used to produce hydrated alkali metal silicate powders by recovering the product from the drying step.

12 Claims, No Drawings

METHOD FOR PREPARING A HIGHLY SILICEOUS ALKALI METAL SILICATE GLASS AND HYDRATED POWDER

BACKGROUND

Alkali metal silicate glasses are formed by the fusion of a source of alkali, usually alkali metal carbonate, and a source of silica, usually sand, at temperatures between 1000° and 1400°C. In general, temperatures within this range are sufficient to cause the reaction of the raw materials and to promote diffusion in the glass bed to form satisfactory silicate glasses at silica to alkali ratios ($SiO_2/M_2O$) of less than about 4.0/1.0 wherein M usually stands for sodium or potassium. However, the preparation of such glasses with ratios above about 4.5/1.0 has been difficult in the past. The homogeneity of such high ratio glasses has been almost unfailingly poor. The reasons for this poor quality glass are probably complex but certainly the high viscosity of the melts of such glasses contributes to the overall effect by preventing diffusion within the molten glass bed to achieve homogeneity. The viscosity of a sodium silicate glass with a $SiO_2/Na_2O$ ratio of 4.6/1.0 is over 100 poises at 1400°C and about 3500 poises at 1100° C.

SUMMARY OF THE INVENTION

I have discovered a method for preparing homogeneous alkali metal silicate glasses of $SiO_2/M_2O$ mol ratios of more than 4.5/1.0 at the temperatures ordinarily used in a glass furnace. The method comprises, preparing a mixture of alkali metal silicate solution and colloidal silica sol, causing said mixture to become a uniform colloidal solution, drying the resulting solution, fusing the dried material at 1100° to 1400°C and cooling the fused material. Hydrated alkali metal silicate powders of $SiO_2/M_2O$ mol ratio greater than 4.5/1.0 can also be prepared by this method by recovering the product before the fusion step.

THE INVENTION

The alkali metal silicate solutions that are employed in the process of this invention can have mol ratios of $SiO_2/M_2O$ between 1.6/1.0 and 4.0/1.0 wherein M stands for an alkali metal usually sodium or potassium. Examples of useful sodium and potassium silicate solutions include:

| Silicate | $SiO_2/M_2O$ Wt. Ratio | Mol Ratio |
| --- | --- | --- |
| B-W Sodium Silicate | 1.60 | 1.65 |
| RU Sodium Silicate | 2.40 | 2.47 |
| N Sodium Silicate | 3.22 | 3.30 |
| S 35 Sodium Silicate | 3.75 | 3.92 |
| Kasil No. 1 Potassium Silicate | 2.5 | 3.92 |

B-W, RU, N, S 35 and Kasil are registered trademarks of the Philadelphia Quartz Company.

The colloidal silica sols used in this invention can be any of a number of such materials usually made by the controlled polymerization of dealkalized alkali metal silicate as described in U.S. Pat. No. 3,440,175 hereby incorporated by reference and other patents. It is also possible to use silica sols made by reacting silicon metal with water in the presence of diluted base as described in U.S. Pat. No. 3,650,977 hereby incorporated by reference. Such sols are usually stabilized with sodium ion and have $SiO_2/Na_2O$ mol ratios between 70/1 and 400/1. The concentration can be between 15 and 50% $SiO_2$. Colloidal silica sols are commercially available under various tradenames.

The components are mixed in any standard blending device that is capable of rapid blending and which has the capacity to eliminate the slurry-like coacervate that is normally produced when the sol and the silicate solution are blended or mixed at slow rate. The proportions of the components are, of course, dependent upon the desired ratio of $SiO_2/M_2O$ and the concentration of solids that can be obtained at that ratio. The mol ratio of $SiO_2/M_2O$ in the prepared solution can be between 4.5/1.0 and 20/1.0 and the concentration is generally 20 to 35% total solids consisting of alkali and silica.

Such ratios and concentrations can be obtained by combining 10 to 90% alkali metal silicate and 15 to 85% of colloidal silica sol. Of primary importance is that the proportions of silicate solution to sol is such that the $SiO_2/M_2O$ ratio is that desired in the end product. The composition may require dilution to result in a pumpable coacervate and 0 to 30% water or more can be added as necessary.

The resulting slurry-like coacervate is heated for a sufficient period of time to redissolve the coacervate and form a relatively stable and highly colloidal solution. Excessive temperature is not desired and I have found that this can generally be accomplished at temperatures ranging between 75° and 100°C for periods of about 3 to 20 minutes depending upon the water present and the $SiO_2/M_2O$ ratio. This solution is dried by any convenient method such as spray drying, drum drying, fluid bed drying, etc. I prefer the use of spray drying because of its convenience in materials handling but I have not found any difference in the products of any of the drying methods. The resulting powder has between 12 and 25% moisture and is a free-flowing uniform material and can be retained as a product. This material is charged to a glass melting furnace and fused at 1100° to 1400°C. After the molten glass bed is formed and the fusion is complete the bed is tapped and the glass cooled by conventional methods. The resulting glass is of good quality and quite uniform. The glass can be used for many purposes, for example, producing insoluble foams by gassing the molten glass from the furnace.

EXAMPLES

A further understanding of the present invention can be obtained from the following examples which illustrate certain embodiments of the invention and should not be considered restrictive.

EXAMPLE 1

This example illustrates the prior art method of preparing highly siliceous glasses. Sodium carbonate and sand in amounts sufficient to provide a $SiO_2/Na_2O$ mol ratio of 7.5/1.0 were charged to a glass furnace and fused at a temperature of 1350°C for 12 hours. At the end of this time the furnace was tapped and the glass cooled. Certain areas of the molten glass were noted to be very white. Analysis indicated that these areas were unreacted sand. Other portions of the glass proved to be slightly soluble being further proof that the ratio of $SiO_2/Na_2O$ was not uniform throughout the glass.

EXAMPLE 2

This example illustrates an embodiment of this invention; 100 pbw of sodium silicate (3.3 $SiO_2/1.0$ $Na_2O$, 28.7% $SiO_2$, 8.9% $Na_2O$) were mixed with 138 pbw of Ludox HS silica sol (colloidal silica sol from duPont with 30% $SiO_2$ and 90 $SiO_2/Na_2O$ wt. ratio) and heated at 95°C for 10 minutes. The resulting uniform solution was highly colloidal as shown by a "blue" color. A portion of this solution was spray dried to a free flowing product having a moisture content of 13.7%. The resulting powder was charged directly to a glass furnace and fused at 1350° for 6 hours. The molten glass was tapped and cooled. No areas of unreacted material were observed. The resulting solid appeared quite uniform. The analysis showed a $SiO_2/Na_2O$ ratio of 7.5/1.0 and in slurrying the glass with water only a small amount of alkali was leached from the glass indicating that the glass was uniform.

EXAMPLE 3

A portion of the uniform solution of Example 2 was double drum dried to 17% moisture. The powder was charged directly to the glass furnace and fused at 1200°C for 10 hours. The resultant product had the same characteristics as the product of Example 2.

EXAMPLE 4

Raw materials as in Example 2 were combined to form a mixture having a $SiO_2/Na_2O$ ratio of 15/1.0. The mixture was heated for 15 minutes at 95°C and formed a uniform, highly colloidal solution. The solution was spray dried to a free flowing powder with 12% moisture and fused for 10 hours at 1300°C to form a uniform glass that was completely insoluble except for limited leaching of surface alkali.

EXAMPLE 5

A portion (90 pbw) of the molten glass formed as described in Example 4 was mixed with 10 pbw of calcium carbonate and cooled. At the temperature of mixing, the carbonate decomposes forming carbon dioxide bubbles within the glass forming a foam.

I claim:
1. A method of preparing hydrated alkali metal silicate powders having a $SiO_2/M_2O$ mol ratio between 4.5/1.0 and 20/1.0, wherein M stands for an alkali metal, comprising:
   a. preparing a mixture consisting essentially of:
      1. 10 to 90% by weight alkali metal silicate solution having a mol ratio of $SiO_2/M_2O$ between 1.6/1.0 and 4.0/1.0,
      2. 15 to 85% by weight colloidal silica sol having a mol ratio of $SiO_2/M_2O$ between 70/1.0 and 400/1.0 and a concentration of 15 to 50% $SiO_2$, and
      3. 0 to 305 by weight water;
   b. heating said mixture for a sufficient period of time to form a uniform colloidal solution; and
   c. drying said uniform colloidal solution to form the powder.

2. The method of claim 1 wherein the alkali metal is selected from the group consisting of sodium and potassium.

3. The method of claim 1 wherein said mixture is heated at 75° to 100°C for 3 to 20 minutes to form the uniform colloidal solution of step (b) therein.

4. The method of claim 1 wherein the uniform colloidal solution is dried to a powder with a moisture content of 12 to 25%.

5. The method of claim 4 wherein the drying is accomplished by spray drying.

6. A method of preparing uniform alkali metal silicate glass having a $SiO_2/M_2O$ mol ratio between 4.5/1.0 and 20/1.0, wherein M stands for an alkali metal, comprising:
   a. preparing a mixture consisting essentially of:
      1. 10 to 90% by weight alkali metal silicate solution having a mol ratio of $SiO_2/M_2O$ between 1.6/1.0 and 4.0/1.0,
      2. 15 to 85% by weight colloidal silica sol having a mol ratio of $SiO_2/M_2O$ between 70/1.0 and 400/1.0 and a concentration of 15 to 50% $SiO_2$, and
      3. 0 to 30% by weight water;
   b. heating said mixture for a sufficient period of time to form a uniform colloidal solution;
   c. drying said uniform colloidal solution to a powder; and
   d. fusing said powder at 1100° to 1400°C to form a uniform molten glass.

7. The method of claim 6 wherein the molten glass is cooled.

8. The method of claim 6 wherein the alkali metal is selected from the group consisting of sodium and potassium.

9. The method of claim 6 wherein said mixture is heated at 75° to 100°C for 3 to 20 minutes to form the uniform colloidal solution of step (b) therein.

10. The method of claim 6 wherein the uniform colloidal solution is dried to a powder with a moisture content of 12 to 25%.

11. The method of claim 10 wherein the drying is accomplished by spray drying.

12. The method of claim 6 wherein the molten glass is contacted with a means for incorporating gas bubbles in said molten glass and cooling thereby forming a foam.

* * * * *